(12) United States Patent
Wang et al.

(10) Patent No.: US 7,933,475 B2
(45) Date of Patent: Apr. 26, 2011

(54) METHOD AND APPARATUS FOR PROVIDING BACK-LIGHTING IN A DISPLAY DEVICE

(75) Inventors: Chun-Ming Wang, San Jose, CA (US);
Ming-Hau Tung, San Jose, CA (US);
Surya Prakash Ganti, San Jose, CA (US)

(73) Assignee: Qualcomm MEMS Technologies, Inc., San Diego, CA (US)

(*) Notice: Subject to any disclaimer, the term of this patent is extended or adjusted under 35 U.S.C. 154(b) by 0 days.

(21) Appl. No.: 12/544,184

(22) Filed: Aug. 19, 2009

(65) Prior Publication Data
US 2009/0310208 A1 Dec. 17, 2009

Related U.S. Application Data

(63) Continuation of application No. 11/357,702, filed on Feb. 17, 2006, now Pat. No. 7,603,001.

(51) Int. Cl.
*G02F 1/01* (2006.01)
*G02B 26/00* (2006.01)
*G03F 7/00* (2006.01)

(52) U.S. Cl. ............ 385/1; 359/290; 359/237; 430/311

(58) Field of Classification Search ................... None
See application file for complete search history.

(56) References Cited

U.S. PATENT DOCUMENTS

| | | |
|---|---|---|
| 2,518,647 A | 8/1950 | Teeple et al. |
| 3,247,392 A | 4/1966 | Thelen |
| 4,200,472 A | 4/1980 | Chappell |
| 4,228,437 A | 10/1980 | Shelton |
| 4,400,577 A | 8/1983 | Spear |
| 4,441,789 A | 4/1984 | Pohlack |
| 4,633,031 A | 12/1986 | Todorof |
| 4,832,459 A | 5/1989 | Harper |
| 4,961,617 A | 10/1990 | Shahidi |
| 5,110,370 A | 5/1992 | Vogeli et al. |
| 5,151,801 A | 9/1992 | Hiroshima |
| 5,221,982 A | 6/1993 | Faris |
| 5,261,970 A | 11/1993 | Landis et al. |
| 5,289,300 A | 2/1994 | Yamazaki |
| 5,356,488 A | 10/1994 | Hezel |

(Continued)

FOREIGN PATENT DOCUMENTS

CN 1158182 8/1997

(Continued)

OTHER PUBLICATIONS

Chemical Properties Handbook, McGraw-Hill, 1999, Refractive Index, Dipole Moment and Radius of Gyration; Inorganic Compounds, No. 151: O2Si.

(Continued)

*Primary Examiner* — Tina M Wong
(74) *Attorney, Agent, or Firm* — Knobbe, Martens, Olson & Bear, LLP

(57) ABSTRACT

Methods and apparatus for providing lighting in a display are provided. In one embodiment, a microelectromechanical system (MEMS) is provided that includes a transparent substrate and a plurality of interferometric modulators. The interferometric modulators include an optical stack coupled to the transparent substrate, a reflective layer over the optical stack, and one or more posts to support the reflective layer and to provide a path for light from a backlight for lighting the display.

23 Claims, 15 Drawing Sheets

U.S. PATENT DOCUMENTS

| | | | |
|---|---|---|---|
| 5,615,024 A | 3/1997 | May et al. |
| 5,633,739 A | 5/1997 | Matsuyama |
| 5,671,314 A | 9/1997 | Gregory et al. |
| 5,671,994 A | 9/1997 | Tai |
| 5,673,128 A | 9/1997 | Ohta et al. |
| 5,712,694 A | 1/1998 | Taira et al. |
| 5,731,857 A | 3/1998 | Neijzen |
| 5,771,124 A | 6/1998 | Kintz |
| 5,782,995 A | 7/1998 | Nanya et al. |
| 5,805,117 A | 9/1998 | Mazurek |
| 5,808,708 A | 9/1998 | Oyama et al. |
| 5,886,688 A | 3/1999 | Fifield |
| 5,999,239 A | 12/1999 | Larson |
| 6,002,829 A | 12/1999 | Winston |
| 6,008,449 A | 12/1999 | Cole |
| 6,123,431 A | 9/2000 | Teragaki |
| 6,151,089 A | 11/2000 | Yang et al. |
| 6,300,558 B1 | 10/2001 | Takamoto |
| 6,323,415 B1 | 11/2001 | Uematsu et al. |
| 6,359,668 B1 | 3/2002 | Iijima et al. |
| 6,399,257 B1 | 6/2002 | Shirota et al. |
| 6,456,279 B1 | 9/2002 | Kubo |
| 6,483,613 B1 | 11/2002 | Woodgate et al. |
| 6,538,813 B1 | 3/2003 | Magno |
| 6,577,429 B1 | 6/2003 | Kurtz |
| 6,603,520 B2 | 8/2003 | Umemoto |
| 6,631,998 B2 | 10/2003 | Egawa et al. |
| 6,642,913 B1 | 11/2003 | Kimura |
| 6,643,067 B2 | 11/2003 | Miyamae |
| 6,652,109 B2 | 11/2003 | Nakamura |
| 6,657,700 B2 | 12/2003 | Sako et al. |
| 6,667,782 B1 | 12/2003 | Taira et al. |
| 6,742,907 B2 | 6/2004 | Funamoto et al. |
| 6,760,135 B1 | 7/2004 | Payne |
| 6,778,746 B2 | 8/2004 | Charlton |
| 6,794,119 B2 * | 9/2004 | Miles ............................ 430/313 |
| 6,852,396 B1 | 2/2005 | Mineo |
| 6,864,882 B2 | 3/2005 | Newton |
| 6,871,982 B2 | 3/2005 | Holman et al. |
| 6,880,959 B2 | 4/2005 | Houston |
| 6,883,924 B2 | 4/2005 | Maeda et al. |
| 6,885,377 B2 | 4/2005 | Lim |
| 6,917,469 B2 | 7/2005 | Momose |
| 6,951,401 B2 | 10/2005 | Van Hees et al. |
| 6,972,827 B2 | 12/2005 | Mi |
| 7,012,659 B2 | 3/2006 | Smith et al. |
| 7,019,734 B2 | 3/2006 | Cross et al. |
| 7,038,752 B2 | 5/2006 | Lin |
| 7,042,444 B2 | 5/2006 | Cok |
| 7,042,643 B2 | 5/2006 | Miles |
| 7,046,409 B2 | 5/2006 | Kihara |
| 7,050,219 B2 | 5/2006 | Kimura |
| 7,099,058 B2 | 8/2006 | Takemori et al. |
| 7,110,158 B2 | 9/2006 | Miles |
| 7,133,022 B2 | 11/2006 | Grabert |
| 7,187,489 B2 | 3/2007 | Miles |
| 7,218,812 B2 | 5/2007 | Maxwell |
| 7,236,663 B2 | 6/2007 | Wakita et al. |
| 7,324,248 B2 | 1/2008 | Brotherton-Ratcliffe et al. |
| 7,336,329 B2 | 2/2008 | Yoon |
| 7,342,705 B2 | 3/2008 | Chui et al. |
| 7,342,709 B2 | 3/2008 | Lin |
| 7,349,141 B2 | 3/2008 | Tung et al. |
| 7,352,501 B2 | 4/2008 | Chopra et al. |
| 7,352,940 B2 | 4/2008 | Charters |
| 7,360,899 B2 | 4/2008 | McGuire |
| 7,385,748 B2 | 6/2008 | Miles |
| 7,417,735 B2 | 8/2008 | Cummings |
| 7,420,638 B2 | 9/2008 | Tasaka et al. |
| 7,456,805 B2 | 11/2008 | Ouderkirk |
| 7,477,809 B1 | 1/2009 | Tan et al. |
| 7,498,621 B2 | 3/2009 | Seitz |
| 7,508,571 B2 | 3/2009 | Gally |
| 7,520,642 B2 | 4/2009 | Holman et al. |
| 7,561,323 B2 | 7/2009 | Gally |
| 7,564,612 B2 | 7/2009 | Chui |
| 7,603,001 B2 | 10/2009 | Wang et al. |
| 7,630,123 B2 | 12/2009 | Kothari |
| 7,663,714 B2 | 2/2010 | Haga et al. |
| 7,701,029 B2 | 4/2010 | Mabuchi |
| 7,710,636 B2 | 5/2010 | Chui |
| 7,719,500 B2 | 5/2010 | Chui |
| 7,719,747 B2 | 5/2010 | Tung |
| 7,750,886 B2 | 7/2010 | Sampsell |
| 7,766,498 B2 | 8/2010 | Sampsell |
| 7,777,954 B2 | 8/2010 | Gruhlke |
| 7,807,488 B2 | 10/2010 | Gally |
| 7,864,395 B2 | 1/2011 | Chui |
| 7,880,954 B2 | 2/2011 | Sampsell |
| 2001/0055076 A1 | 12/2001 | Ochi et al. |
| 2002/0050286 A1 | 5/2002 | Kubato |
| 2002/0075245 A1 | 6/2002 | Kawashima |
| 2002/0075555 A1 | 6/2002 | Miles |
| 2002/0131151 A1 | 9/2002 | Engler et al. |
| 2002/0176035 A1 | 11/2002 | Yamazaki |
| 2003/0006730 A1 | 1/2003 | Tachibana |
| 2003/0128538 A1 | 7/2003 | Shinohara et al. |
| 2003/0165067 A1 | 9/2003 | Imamura |
| 2003/0210222 A1 | 11/2003 | Ogiwara et al. |
| 2003/0210363 A1 | 11/2003 | Yasukawa et al. |
| 2003/0213514 A1 | 11/2003 | Ortabasi |
| 2003/0222857 A1 | 12/2003 | Abileah |
| 2004/0027339 A1 | 2/2004 | Schulz |
| 2004/0061946 A1 | 4/2004 | Yoshikawa |
| 2004/0125048 A1 | 7/2004 | Toshihiro et al. |
| 2004/0184134 A1 | 9/2004 | Makigaki |
| 2004/0188150 A1 | 9/2004 | Richard et al. |
| 2004/0217919 A1 | 11/2004 | Piehl et al. |
| 2004/0233357 A1 | 11/2004 | Fujimori |
| 2005/0010568 A1 | 1/2005 | Nagatomo |
| 2005/0024890 A1 | 2/2005 | Yamamoto |
| 2005/0117190 A1 | 6/2005 | Iwauchi et al. |
| 2005/0231981 A1 | 10/2005 | Hoelen et al. |
| 2005/0271325 A1 | 12/2005 | Anderson |
| 2006/0062016 A1 | 3/2006 | Dejima |
| 2006/0066541 A1 | 3/2006 | Gally |
| 2006/0077124 A1 | 4/2006 | Gally |
| 2006/0110090 A1 | 5/2006 | Ellwood |
| 2006/0114244 A1 | 6/2006 | Saxena |
| 2006/0130889 A1 | 6/2006 | Li et al. |
| 2006/0132383 A1 | 6/2006 | Gally et al. |
| 2006/0187676 A1 | 8/2006 | Ishikura |
| 2006/0201546 A1 | 9/2006 | Yokoyama |
| 2006/0209012 A1 | 9/2006 | Hagood, IV |
| 2006/0227532 A1 | 10/2006 | Ko et al. |
| 2006/0262562 A1 | 11/2006 | Fukasawa |
| 2006/0279558 A1 | 12/2006 | Van Delden et al. |
| 2006/0291769 A1 * | 12/2006 | Spoonhower et al. ........... 385/14 |
| 2007/0036492 A1 * | 2/2007 | Lee .................................. 385/89 |
| 2007/0097694 A1 | 5/2007 | Faase |
| 2007/0125415 A1 | 6/2007 | Sachs |
| 2007/0133226 A1 | 6/2007 | Mi |
| 2007/0147087 A1 | 6/2007 | Parker |
| 2007/0171418 A1 | 7/2007 | Nyhart |
| 2007/0187852 A1 | 8/2007 | Parker et al. |
| 2007/0210163 A1 | 9/2007 | Han |
| 2007/0229737 A1 | 10/2007 | Takeda |
| 2007/0235072 A1 | 10/2007 | Bermel |
| 2007/0253717 A1 | 11/2007 | Charters |
| 2007/0279727 A1 | 12/2007 | Gandhi |
| 2007/0285406 A1 | 12/2007 | Kukulj |
| 2008/0030657 A1 | 2/2008 | Wu et al. |
| 2008/0074402 A1 | 3/2008 | Cornish |
| 2008/0079687 A1 | 4/2008 | Cernasov |
| 2008/0090025 A1 | 4/2008 | Freking |
| 2008/0105298 A1 | 5/2008 | Lu et al. |
| 2008/0192484 A1 | 8/2008 | Lee |
| 2008/0232135 A1 | 9/2008 | Kinder |
| 2008/0278460 A1 | 11/2008 | Arnett et al. |
| 2009/0050454 A1 | 2/2009 | Matsukawa et al. |
| 2009/0086301 A1 | 4/2009 | Gally |
| 2009/0086466 A1 | 4/2009 | Sugita |
| 2009/0090611 A1 | 4/2009 | Zeijlon |
| 2009/0097100 A1 | 4/2009 | Gally |
| 2009/0101192 A1 | 4/2009 | Kothari |
| 2009/0126777 A1 | 5/2009 | Khazeni |
| 2009/0126792 A1 | 5/2009 | Gruhlke |

| | | | |
|---|---|---|---|
| 2009/0145479 A1 | 6/2009 | Williams | |
| 2009/0147332 A1 | 6/2009 | Bita et al. | |
| 2009/0147535 A1 | 6/2009 | Mienko | |
| 2009/0151771 A1 | 6/2009 | Kothari | |
| 2009/0168459 A1 | 7/2009 | Holman | |
| 2009/0201571 A1 | 8/2009 | Gally | |
| 2009/0225394 A1 | 9/2009 | Chui | |
| 2009/0242024 A1 | 10/2009 | Kothari | |
| 2009/0244690 A1 | 10/2009 | Lee | |
| 2009/0251752 A1 | 10/2009 | Gruhlke | |
| 2009/0255569 A1 | 10/2009 | Sampsell | |
| 2009/0257108 A1 | 10/2009 | Gruhlke | |
| 2009/0293955 A1 | 12/2009 | Kothari | |
| 2009/0296194 A1 | 12/2009 | Gally | |
| 2009/0303417 A1 | 12/2009 | Mizushima et al. | |
| 2009/0323153 A1 | 12/2009 | Sampsell | |
| 2010/0026727 A1 | 2/2010 | Bita et al. | |
| 2010/0052880 A1 | 3/2010 | Laitinen et al. | |
| 2010/0141557 A1 | 6/2010 | Gruhlke | |
| 2010/0149624 A1 | 6/2010 | Kothari | |
| 2010/0165443 A1 | 7/2010 | Chui | |
| 2010/0182308 A1 | 7/2010 | Holman | |
| 2010/0302616 A1 | 12/2010 | Bita | |
| 2010/0309103 A1 | 12/2010 | Sampsell | |

FOREIGN PATENT DOCUMENTS

| | | | |
|---|---|---|---|
| CN | 1517743 | | 8/2004 |
| CN | 1643439 A | | 7/2005 |
| DE | 34 02 746 | | 8/1985 |
| DE | 196 22 748 | | 12/1997 |
| DE | 102 28 946 | | 1/2004 |
| DE | 103 29 917 A1 | | 2/2005 |
| DE | 10 2007 0250 | | 12/2008 |
| EP | 0 278 038 | | 8/1988 |
| EP | 0 867 747 A2 | | 9/1998 |
| EP | 0 907 050 | | 4/1999 |
| EP | 1 122 586 | | 8/2001 |
| EP | 1 231 757 | | 8/2002 |
| EP | 1 279 892 | | 1/2003 |
| EP | 1 640 776 | | 3/2006 |
| EP | 2 251 731 | | 11/2010 |
| GB | 2 315 356 | | 1/1998 |
| GB | 2 336 933 | | 3/1999 |
| JP | 56-010976 | | 2/1981 |
| JP | 56-010977 | | 2/1981 |
| JP | 57-3266 | | 1/1982 |
| JP | 58 115781 | | 8/1983 |
| JP | 60 165621 A | | 8/1985 |
| JP | 60 242408 | | 12/1985 |
| JP | 02-151079 A | | 6/1990 |
| JP | 04-238321 A | | 8/1992 |
| JP | 06-209114 | | 7/1994 |
| JP | 06-265870 A | | 9/1994 |
| JP | 07-509327 | | 10/1995 |
| JP | 08 050283 A | | 2/1996 |
| JP | 09-507920 | | 8/1997 |
| JP | 09-260696 | | 10/1997 |
| JP | 09 307140 | | 11/1997 |
| JP | 10 500224 | | 1/1998 |
| JP | 10-096910 | | 4/1998 |
| JP | 10 325953 | | 12/1998 |
| JP | 11 002712 | | 1/1999 |
| JP | 11 002764 | | 1/1999 |
| JP | 11-052887 | | 2/1999 |
| JP | 11 160687 | | 6/1999 |
| JP | 11 174234 | | 7/1999 |
| JP | 11 211999 | | 8/1999 |
| JP | 11 249132 | | 9/1999 |
| JP | 11 316553 | | 11/1999 |
| JP | 2000-028933 | | 1/2000 |
| JP | 2000-075287 | | 3/2000 |
| JP | 2000 075293 | | 3/2000 |
| JP | 2000 181367 | | 6/2000 |
| JP | 2000 193933 | | 7/2000 |
| JP | 2000 214804 A | | 8/2000 |
| JP | 2000-258622 | | 9/2000 |
| JP | 2000 514568 | | 10/2000 |
| JP | 2001 305312 | | 10/2001 |
| JP | 2001-345458 | | 12/2001 |
| JP | 2002-014344 | | 1/2002 |
| JP | 2002 523798 | | 7/2002 |
| JP | 2002-229023 | | 8/2002 |
| JP | 2002 245835 | | 8/2002 |
| JP | 2002-297044 | | 10/2002 |
| JP | 2003 007114 | | 1/2003 |
| JP | 2003 057653 | | 2/2003 |
| JP | 2003 131215 | | 5/2003 |
| JP | 2003-140118 | | 5/2003 |
| JP | 2003 173713 | | 6/2003 |
| JP | 2003 186008 | | 7/2003 |
| JP | 2003 188959 | | 7/2003 |
| JP | 2003 195201 | | 7/2003 |
| JP | 2003-315694 | | 11/2003 |
| JP | 2004-012918 | | 1/2004 |
| JP | 2004-062099 | | 2/2004 |
| JP | 2004-070189 | | 3/2004 |
| JP | 2004-087409 | | 3/2004 |
| JP | 2004-111278 | | 4/2004 |
| JP | 2004-126196 | | 4/2004 |
| JP | 2004-510185 | | 4/2004 |
| JP | 2004-145109 | | 5/2004 |
| JP | 2004-206049 | | 7/2004 |
| JP | 2004-219843 A | | 8/2004 |
| JP | 2005-031219 | | 2/2005 |
| JP | 2005-308871 | | 11/2005 |
| JP | 2006-065360 A | | 3/2006 |
| JP | 2006 107993 | | 4/2006 |
| JP | 2006 120571 | | 5/2006 |
| KR | 2002 010322 | | 2/2002 |
| KR | 2003-0081662 A | | 10/2003 |
| TW | 594155 | | 6/2004 |
| WO | WO 94/06871 A1 | | 3/1994 |
| WO | WO 95/14256 | | 5/1995 |
| WO | WO 95/15582 A1 | | 6/1995 |
| WO | WO 95/30924 | | 11/1995 |
| WO | WO 97/44707 A | | 11/1997 |
| WO | WO 97/46908 | | 12/1997 |
| WO | WO 98/52094 | | 11/1998 |
| WO | WO 99/04296 A | | 1/1999 |
| WO | WO 99/67680 | | 12/1999 |
| WO | WO 00/50807 | | 8/2000 |
| WO | WO 01/57434 | | 8/2001 |
| WO | WO 01/81994 | | 11/2001 |
| WO | WO 03/032058 | | 4/2003 |
| WO | WO 2004/003643 | | 1/2004 |
| WO | WO 2004/012004 | | 2/2004 |
| WO | WO 2004/036270 | | 4/2004 |
| WO | WO 2004/088372 | | 10/2004 |
| WO | WO 2005/011012 | | 2/2005 |
| WO | WO 2006/036496 | | 4/2006 |
| WO | WO 2007/073203 A1 | | 6/2007 |
| WO | WO 2009/011922 A1 | | 1/2009 |

OTHER PUBLICATIONS

Fan et al., "Channel Drop Filters in Photonic Crystals", Optics Express, vol. 3, No. 1, pp. 4-11, 1998.

Little et al., "Vertically Coupled Microring Rosonator Channel Dropping Filter", IEEE Photonics Technology Letters, vol. 11, No. 2, pp. 215-217, 1999.

Magel, "Integrated Optic Devices Using Micromachined Metal Membranes", SPIE vol. 2686, 0-8194-2060-3, pp. 54-63, 1996.

Nakagawa et al., "Wide-Field -of-View Narrow-Band Spectral Filters Based on Photonic Crystal Nanocavities", Optical Society of America, Optics Letters, vol. 27, No. 3, pp. 191-193, 2002.

Oliner, "Radiating Elements and Mutual Coupling," Microwave Scanning Antennas, vol. 2, pp. 131-157 and pp. 190-194, 1966.

Extended European Search Report in App. No. 101709764.4 (IRDM. 047VEPD1) dated Oct. 7, 2010.

International Preliminary Report on Patentability in PCT/US2005/ 032021 (IRDM.190VPC) dated Mar. 3, 2007.

Office Action in U.S. Appl. No. 11/357,702, dated Feb. 14, 2007.

Amendment in U.S. Appl. No. 11/357,702, dated Apr. 10, 2007.

Office Action in U.S. Appl. No. 11/357,702, dated May 10, 2007.

Request for Continued Examination and Amendment in U.S. Appl. No. 11/357,702, dated Oct. 10, 2007.

Notice of Allowance in U.S. Appl. No. 11/357,702, dated Nov. 2, 2007.
Request for Continued Examination and Information Disclosure State,ent in U.S. Appl. No. 11/357,702, dated Jan. 22, 2008.
Notice of Allowance in U.S. Appl. No. 11/357,702, dated Feb. 25, 2008.
Request for Continued Examination and Information Disclosure Statement in U.S. Appl. No. 11/357,702, dated May 23, 2008.
Notice of Allowance in U.S. Appl. No. 11/357,702, dated Jun. 18, 2008.
Request for Continued Examinatin and Information Disclosure Statement in U.S. Appl. No. 11/357,702, dated Sep. 17, 2008.
Notice of Allowance in U.S. Appl. No. 11/357702, dated Sep. 29, 2008.
Request for Continued Examination and Information Disclosure Statement in U.S. Appl. No. 11/357,702, dated Dec. 23, 2008.
Notice of Allowance in U.S. Appl. No. 11/357,702, dated Jan. 28, 2009.
Request for Continued Examination and Information Disclosure Statement in U.S. Appl. No. 11/357,702, dated Apr. 27, 2009.
Amendment and Information Disclosure Statement in U.S. Appl. No. 11/357,702, dated May 5, 2009.
Notice of Allowance in U.S. Appl. No. 11/357702, dated May 8, 2009.
Issue Fee Payment and Amendment in U.S. Appl. No. 11/357,702, dated Aug. 7, 2009.
Response to Amendment in U.S. Appl. No. 11/357,702, dated Aug. 13, 2009.
Notice of Allowance in U.S. Appl. No. 12/036,668 (IRDM.047C2) mailed on Sep. 23, 2009.
RCE and IDS in U.S. Appl. No. 12/036,668 (IRDM.047C2) dated Nov. 13, 2009.
Notice of Allowance in U.S. Appl. No. 12/036,668 (IRDM.047C2) mailed on Nov. 19, 2009.
RCE and IDS in U.S. Appl. No. 12/036,668 (IRDM.047C2) dated Feb. 18, 2010.
Preliminary Amendment in U.S. Appl. No. 12/036,668 (IRDM.047C2) dated Feb. 25, 2010.
Notice of Allowance in U.S. Appl. No. 12/036,668 (IRDM.047C2) mailed on Apr. 8, 2010.
RCE, Amendment, IDS in U.S. Appl. No. 12/036,668 (IRDM.047C2) dated Jul. 7, 2010.
Notice of Allowance in U.S. Appl. No. 12/036,668 (IRDM.047C2) mailed on Jul. 21, 2010.
Request for Continued Examination and Informatin Disclosure Statement In U.S. Appl. No. 12/036,668 (IRDM.047C2) dated Oct. 20, 2010.
Preliminary Amendment in U.S. Appl. No. 12/036,668 (IRDM.047C2) dated Oct. 25, 2010.
Notice of Allowance in U.S. Appl. No. 12/036,668 (IRDM.047C2), dated Nov. 1, 2010.
Supplemental Notice of Allowance in U.S. Appl. No. 12/036,668 (IRDM.047C2), dated Jan. 20, 2011.
Request for Continued Examination, Amendment, and Information Disclosure Statement in U.S. Appl. No. 12/036,668 (IRDM.047C2), dated Feb. 1, 2011.
Office Action in Chinese Application No. 2005101028024 (IRDM.047VCN), dated Mar. 13, 2009.
Decision of Rejection in Chinese Application No. 2005101028024 (IRDM.047VCN), dated Sep. 4, 2009.
Official Communication in European Application No. 05255703.0 (IRDM.047VEP), mailed Mar. 9, 2010.
Official Communication in Japanese Patent Application No. 2005-218736 (IRDM.047VJP) dated Mar. 16, 2010.
Office Action in Mexican Application No. PA/a/2005/010233 (IRDM.047VMX), dated Oct. 30, 2007.
Office Action in Mexican Application No. PA/a/2005/010233 (IRDM.047VMX), dated Jul. 7, 2008.
Amendment in U.S. Appl. No. 12/036,958 (IRDM.049C1), dated Aug. 31, 2009.
Notice of Allowance in U.S. Appl. No. 12/036,958 (IRDM.049C1), dated Dec. 31, 2009.
Office Action in Chinese App. No. 200510103443.4 (IRDM.049VCN) dated Aug. 7, 2009.
Communication in Japanese Patent Application No. 2005-231619 (IRDM.049VJP) dated Nov. 10, 2009.
Communication in Mexican Patent Application No. PA/a/2005/009399 (IRDM.049VMX) dated Mar. 27, 2008.
Notice of Allowance and Examiner Interview Summary in U.S. Appl. No. 12/477802 (IRDM.190C1), dated Apr. 15, 2010.
Request for Continued Examinatin and Information Dosclosure Statement in U.S. Appl. No. 12/477,802 (IRDM.190C1), dated Jul. 14, 2010.
Notice of Allowance in U.S. Appl. No. 12/477,802 (IRDM.190C1), dated Jul. 29, 2010.
Request for Continued Examination and Information Disclosure Statement in U.S. Appl. No. 12/477,802 (IRDM.190C1), dated Oct. 28, 2010.
Preliminary Amendment in U.S. Appl. No. 12/477,802 (IRDM.190C1), dated Nov. 2, 2010.
Office Action in U.S. Appl. No. 12/477,802 (IRDM.190C1), dated Nov. 18, 2010.
Official Communication in Japanese Application No. 2007-533515 (IRDM.190VJP), dated Jun. 4, 2010.
Official Communication in Japanese Application No. 2007-533515 (IRDM.190VJP), dated Jan. 11, 2011.

* cited by examiner

METHOD AND APPARATUS FOR PROVIDING BACK-LIGHTING IN A DISPLAY DEVICE

RELATED APPLICATIONS

This application is a continuation application of U.S. application Ser. No. 11/357,702 filed Feb. 17, 2006, entitled METHOD AND APPARATUS FOR PROVIDING BACK-LIGHTING IN AN INTERFEROMETRIC MODULATOR DISPLAY DEVICE, which is hereby incorporated by reference herein in its entirety.

FIELD OF THE INVENTION

The present invention relates generally to display devices, and more particularly to interferometric modulator display devices.

BACKGROUND OF THE INVENTION

Microelectromechanical systems (MEMS) include micromechanical elements, actuators, and electronics. Micromechanical elements may be created using deposition, etching, and/or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by a transparent medium (e.g., an air gap). As described herein in more detail, the position of one plate in relation to the other plate can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

Conventional interferometric modulator display devices typically implement front-lighting that provides light for viewing images, for example, in the dark. The front-lighting is typically provided by a light strip that surrounds the perimeter of an interferometric modulator display. While such a front-lighting scheme does provide light for viewing images in the dark, there is generally an intrinsic (lighting) uniformity issue as the middle portion of the interferometric modulator display remains darker than the outer edges. As interferometric modulator displays increase in size, this non-uniform effect of light caused by front-lighting increases, which can lead to poor visibility of images in the dark.

Accordingly, what is needed is an improved lighting scheme for an interferometric display device to reduce non-uniformity of light. The present invention addresses such a need.

BRIEF SUMMARY OF THE INVENTION

In general, in one aspect, this specification describes a microelectromechanical system (MEMS) including a transparent substrate, and a plurality of interferometric modulators. The plurality of interferometric modulators include an optical stack coupled to the transparent substrate, a reflective layer over the optical stack, and one or more posts to support the reflective layer and to provide a path for light from a backlight for lighting the interferometric modulators.

Particular features can include one or more of the following features. The MEMS can further include a glass layer between the transparent substrate and the optical stack. The glass layer can include a plurality of scatterers to disperse the light. The glass layer can comprise first spin-on glass (SOG) including the plurality of scatterers. The one or more posts can be composed of a transparent polymer or second spin-on glass (SOG). Each of the one or more posts can further be configured to direct the light to the glass layer. The scatterers can be configured to disperse the light to the interferometric modulators. Each of the one or more posts can further comprise a mirror. The one or more posts can extend from the optical stack through the reflective layer.

The MEMS, as a display device, can further include a display including the MEMS, and a processor that is in electrical communication with the display, the processor being configured to process image data, and a memory device in electrical communication with the processor. The display system can further include a backlight coupled to the display for providing light to the interferometric modulators. The display system can further include a first controller configured to send at least one signal to the display, and a second controller configured to send at least a portion of the image data to the first controller. The display system can further include an image source module configured to send the image data to the processor. The image source module can comprise at least one of a receiver, transceiver, and transmitter. The display system can further include an input device configured to receive input data and to communicate the input data to the processor.

In general in another aspect, this specification describes a micromechanical system (MEMS) including a transparent substrate means, and a plurality of interferometric modulator means. The plurality of interferometric modulator means includes an optical stack means coupled to the transparent substrate means, a reflective layer means over the optical stack means, and one or more post means to support the reflective layer means and to provide a path for light from a backlight means for lighting the interferometric modulator means.

In general in another aspect, this specification describes a method for providing light in a microelectromechanical system (MEMS). The method includes providing a transparent substrate, and forming a plurality of interferometric modulators. Forming a plurality of interferometric modulators includes coupling an optical stack to the transparent substrate, forming a reflective layer over the optical stack, and forming one or more posts to support the reflective layer and to provide a path for light from a backlight for lighting the interferometric modulators.

Implementations may provide one or more of the following advantages. An interferometric modulator display that has an improved lighting scheme for an interferometric display device to having a higher lighting uniformity relative to conventional interferometric modulator displays devices that implement a front-lighting scheme. In one embodiment, uniform lighting is provided through posts (or rails) that are integrated within the interferometric display device. Such a design may be more power-efficient relative to conventional techniques in illuminating a central area of an interferometric display. Moreover, the brightness of an interferometric display may be enhanced even with ambient light.

The details of one or more implementations are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF THE INVENTION

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

As discussed above, conventional interferometric modulator display devices typically implement front-lighting that provides light for viewing images, for example, in the dark. While such a front-lighting scheme does provide light for viewing images in the dark, there is generally an intrinsic lighting uniformity issue as the middle portion of the interferometric modulator display remains darker than the outer edges. As interferometric modulator displays increase in size, this non-uniform effect of light caused by front-lighting increases, which can lead to poor visibility of images in the dark. Accordingly, this specification describes an improved lighting scheme for an interferometric display device to reduce non-uniformity of light. In one embodiment, an interferometric modulator display is provided that includes a transparent substrate, and an optical stack is formed on the transparent substrate. A reflective layer is formed over the optical stack, and one or more posts to support the reflective layer are formed over the optical stack. The one or more posts provide a path for light from a backlight for lighting the interferometric modulator display.

Figure 1:
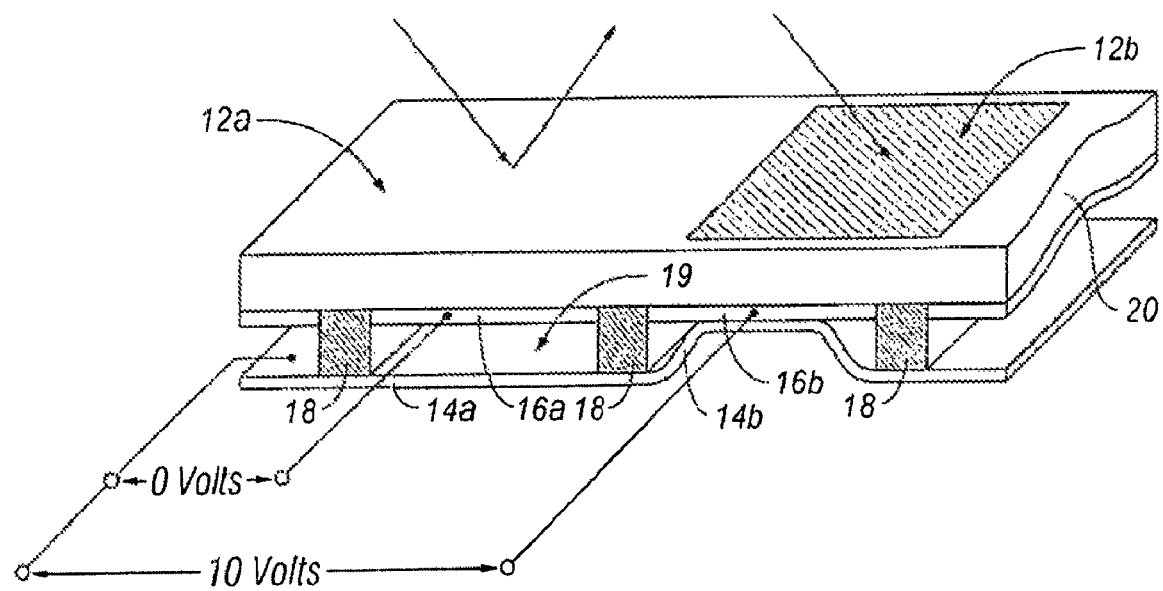
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the fixed partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise of several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. The partially reflective layer can be formed from a variety of materials that are partially reflective such as various metals, semiconductors, and dielectrics. The partially reflective layer can be formed of one or more layers of materials, and each of the layers can be formed of a single material or a combination of materials.

In some embodiments, the layers of the optical stack 16 are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the cavity 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not shown) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5 illustrate one exemplary process and system for using an array of interferometric modulators in a display application.

Figure 2:
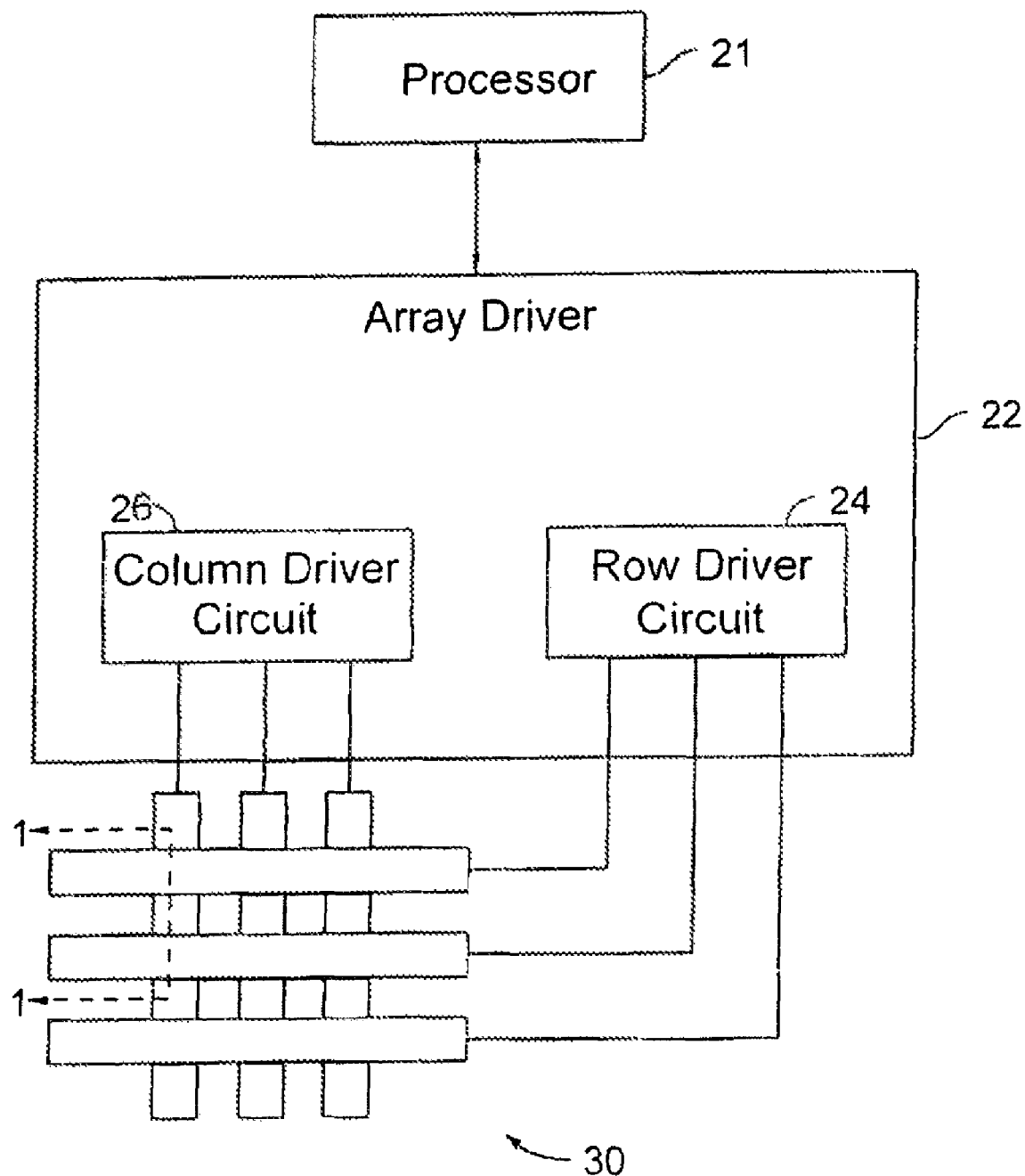
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single-chip or multi-chip microprocessor such as an ARM (Advanced RISC Machine), Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window."

Figures 3, 4:
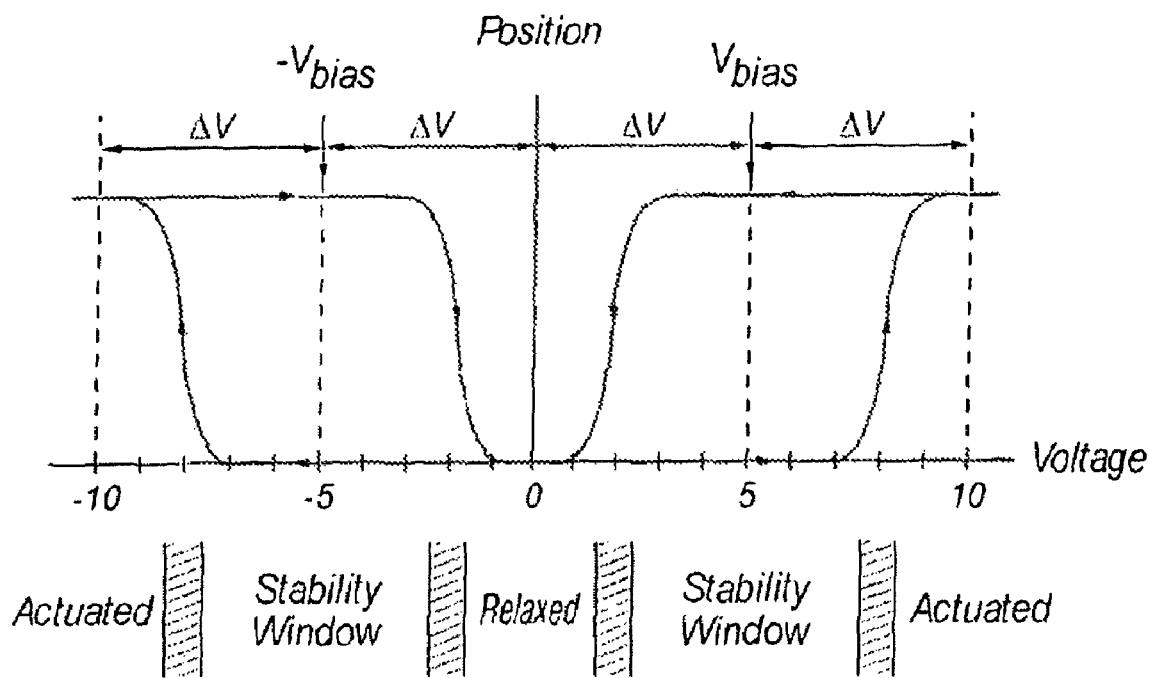
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figure 5A:
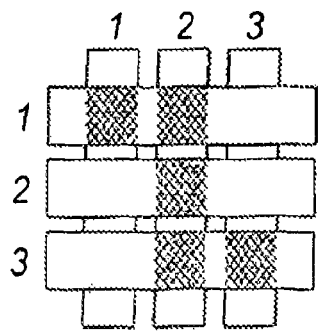
FIGS. 5A and 5B illustrate one exemplary timing diagram for row and column signals that may be used to write a frame of display data to the 3×3 interferometric modulator display of FIG. 2.
Figure 5B:
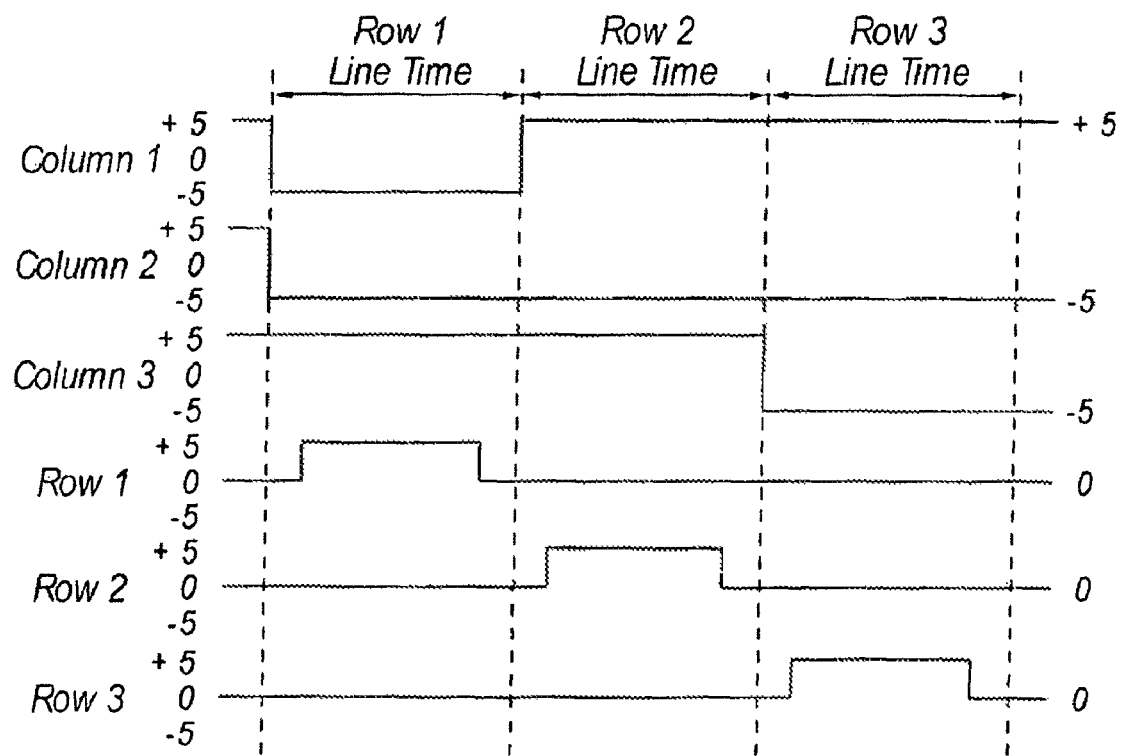

FIGS. 4 and 5A-5B illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the embodiment shown in FIG. 4, actuating a pixel involves setting the appropriate column to $-V_{bias}$, and the appropriate row to $+\Delta V$, which may correspond to −5 volts and +5 volts, respectively. Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to +$V_{bias}$, and the appropriate row to −ΔV. In this embodiment, releasing the pixel is accomplished by setting the appropriate column to −$V_{bias}$, and the appropriate row to the same −ΔV, producing a zero volt potential difference across the pixel.

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the frame shown in FIG. 5A, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
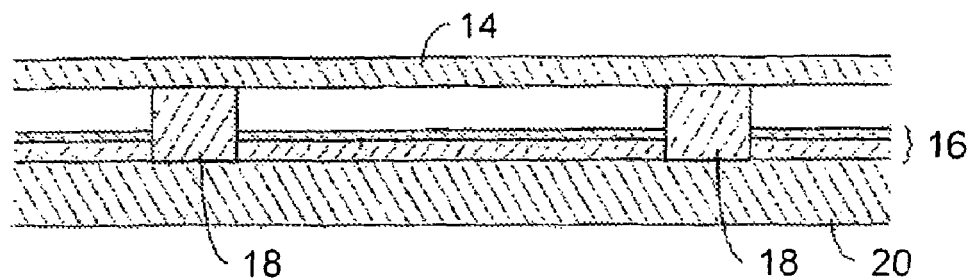
FIG. 6A is a cross section of an interferometric modulator of FIG. 1.
Figure 6B:
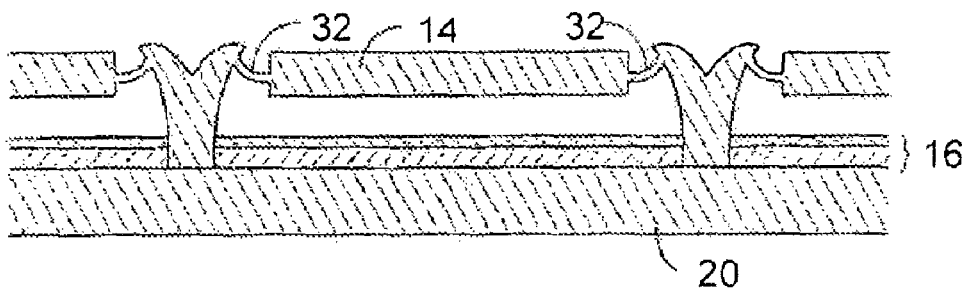
FIGS. 6B-E are alternative embodiments of an interferometric modulator.
Figure 6C:
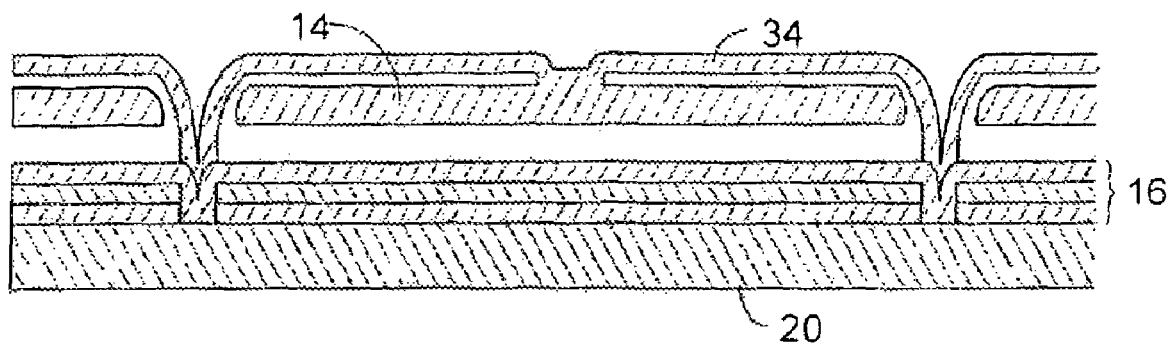
Figure 6D:
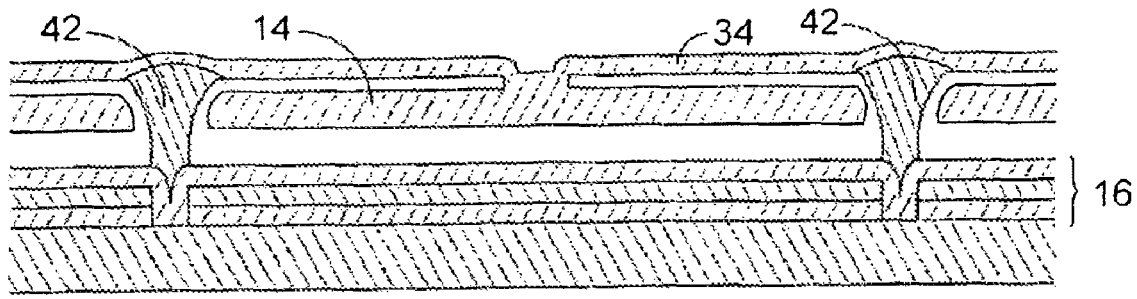
Figure 6E:
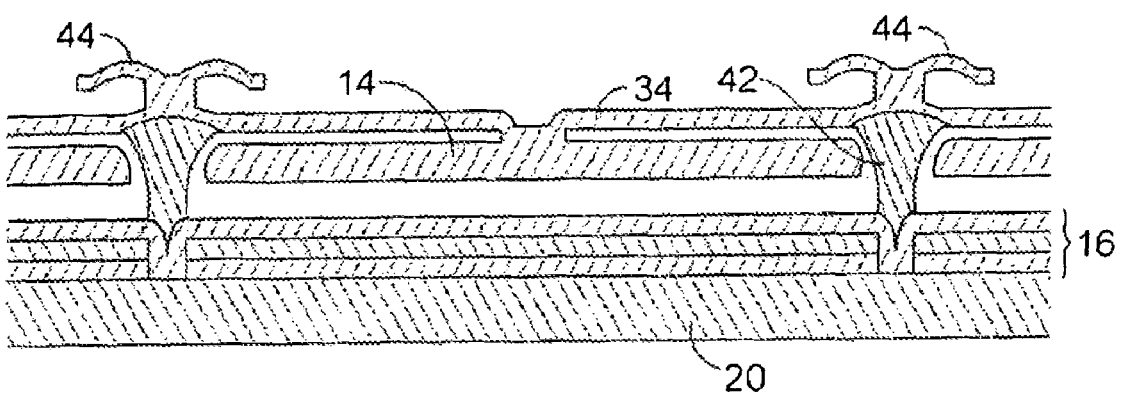

FIG. 6A is a cross section of the embodiment of FIG. 1, where a strip of metal material 14 is deposited on orthogonally extending supports 18. In FIG. 6B, the moveable reflective layer 14 is attached to supports at the corners only, on tethers 32. In FIG. 6C, the moveable reflective layer 14 is suspended from a deformable layer 34, which may comprise a flexible metal. The deformable layer 34 connects, directly or indirectly, to the substrate 20 around the perimeter of the deformable layer 34. These connections are referred to herein as support posts. The embodiment illustrated in FIG. 6D has support post plugs 42 upon which the deformable layer 34 rests. The movable reflective layer 14 remains suspended over the cavity, as in FIGS. 6A-6C, but the deformable layer 34 does not form the support posts by filling holes between the deformable layer 34 and the optical stack 16. Rather, the support posts are formed of a planarization material, which is used to form support post plugs 42. The embodiment illustrated in FIG. 6E is based on the embodiment shown in FIG. 6D, but may also be adapted to work with any of the embodiments illustrated in FIGS. 6A-6C as well as additional embodiments not shown. In the embodiment shown in FIG. 6E, an extra layer of metal or other conductive material has been used to form a bus structure 44. This allows signal routing along the back of the interferometric modulators, eliminating a number of electrodes that may otherwise have had to be formed on the substrate 20.

Figure 7A:
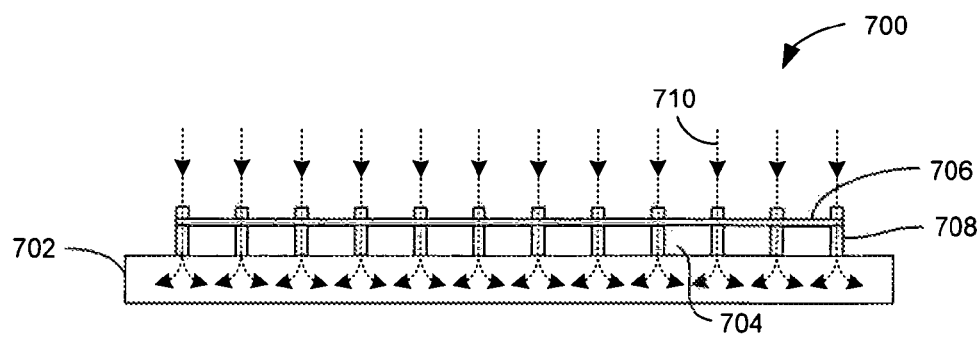
FIGS. 7A-7B illustrate cross-sectional views of an interferometric modulator display.
Figure 7B:
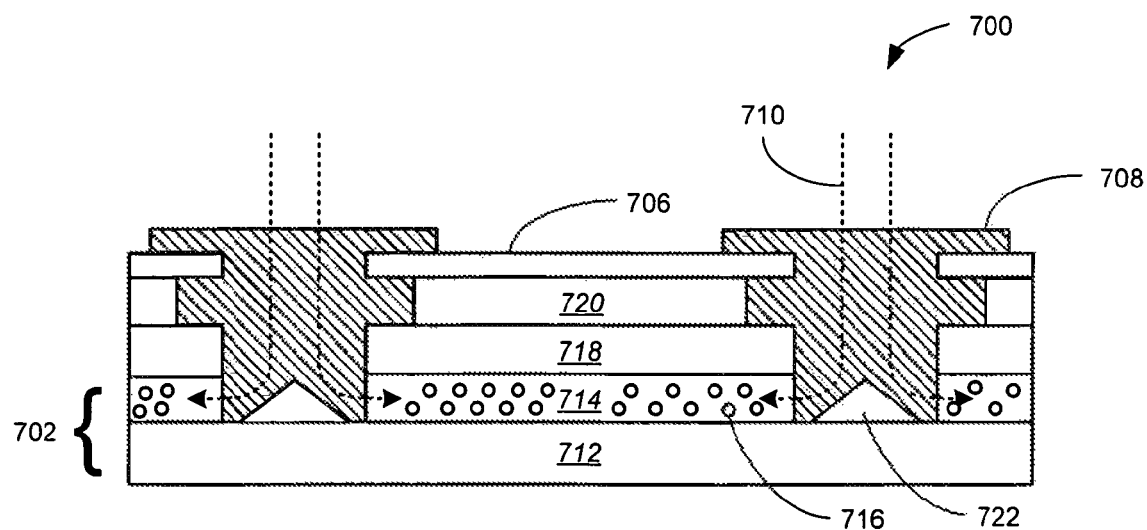

FIG. 7A and FIG. 7B respectively illustrate cross-section and an exploded view of an embodiment of an interferometric modulator display 700. Referring to FIG. 7A, the interferometric modulator display 700 includes a substrate 702, and an interferometric modulator array comprising a plurality of interferometric modulators 704. The interferometric modulator display 700 further includes a mechanical layer 706 and a plurality of support posts 708 to support the mechanical layer 706. In accordance with the present invention, the plurality of support posts 708 are also operable to act as a waveguide (e.g., to provide a path) to propagate light 710 from a backlight (not shown) through the mechanical layer 706 to the substrate 702. Accordingly, the light 710 can be uniformly dispersed across a viewable area of the interferometric modulator display 700.

FIG. 7B shows an exploded view of the interferometric modulator display 700 according to one embodiment. As shown in FIG. 7B, in one embodiment, the substrate 702 comprises two layers—a first substrate layer 712 and a second substrate layer 714. In one embodiment, both the first substrate layer 712 and the second substrate layer are substantially transparent and/or translucent. For example, the first substrate layer 712 can be glass, silica, and/or alumina, and the second substrate layer 714 can comprise spin-on glass (SOG). In one embodiment, the second substrate layer 714 includes scatterers (or reflectors) 716 to further disperse light 710 (from a backlight (not shown)) more uniformly through the substrate 702. Although scatterers 716 are illustrated as circular, one of skill in the art will recognize that any shape or surface suitable for reflecting, directing or scattering light may be used in the invention, including prisms and thin-film layers for redirecting light. The interferometric modulator display 700 further includes an optical stack 718. In one embodiment, the optical stack 718 comprises several fused layers, including an electrode layer (e.g., indium tin oxide (ITO)), a partially reflective layer (e.g., chromium), and a transparent dielectric. The partially reflective layer can be formed from a variety of materials that are partially reflective such as various metals, semiconductors, and dielectrics. The partially reflective layer can be formed of one or more layers of materials, and each of the layers can be formed of a single material or a combination of materials.

As shown in FIG. 7B, the support posts 708 support the mechanical layer 706 over the optical stack 718 such that the mechanical layer 706 is separated from the optical stack by a transparent medium 720 (e.g., an air gap). In addition, as discussed above, the support posts 708 also provide a path for light 710 from a backlight (not shown) to pass through the mechanical layer 706 and the optical stack 718 to the substrate 702. In one embodiment, a mirror 722 (e.g., an aluminum mirror) deflects the light 710 throughout the substrate 702. The mirror 722 may include a light pipe or any other optical pathway for directing light. Thus, unlike a conventional interferometric modulator display that may have poor lighting uniformity due to a front-lighting scheme, the interferometric modulator display 700 implements a backlighting scheme to more uniformly distribute light across an interferometric modulator display.

Figure 8A:
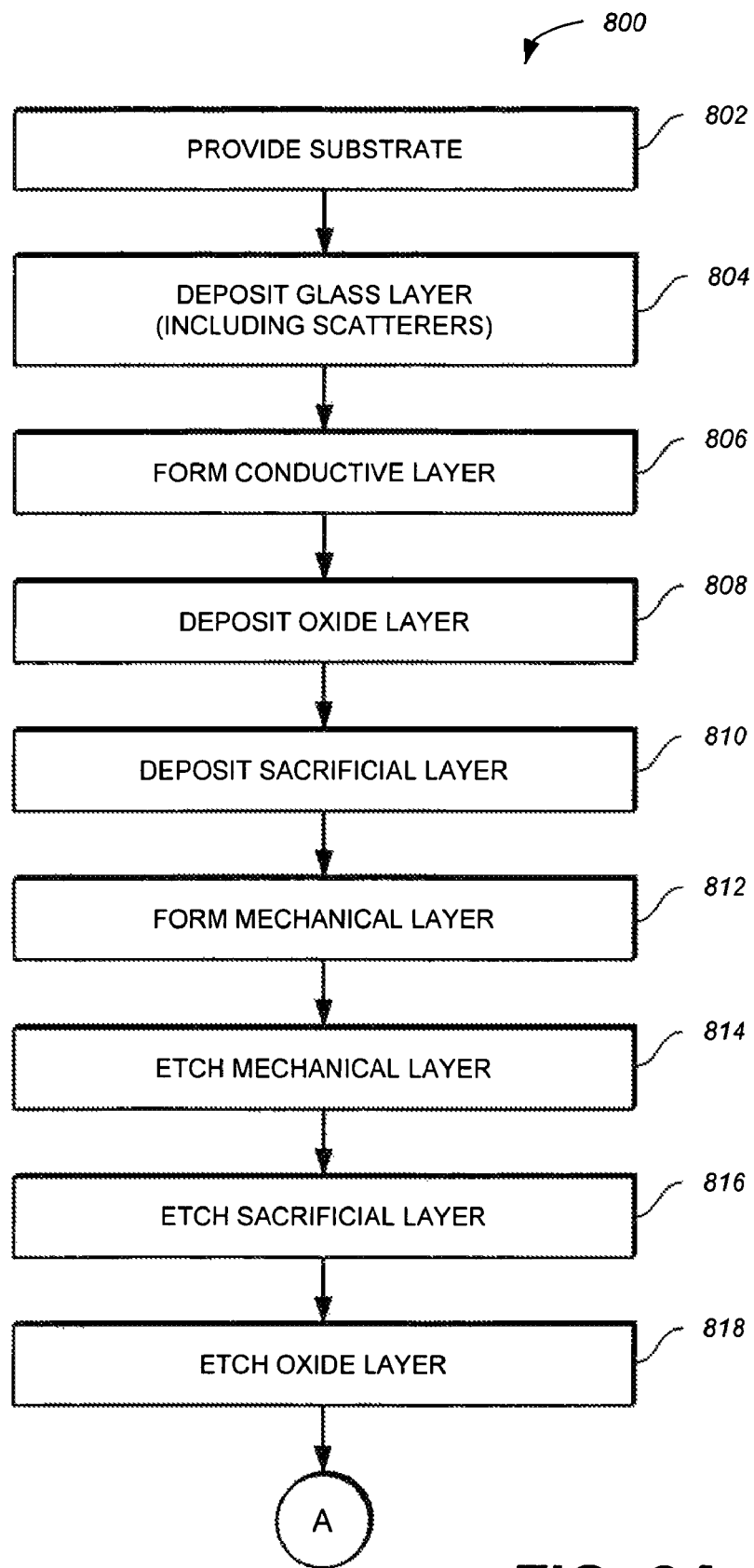
FIGS. 8A-8B illustrate a flow diagram illustrating a process for manufacturing an interferometric modulator display according to one embodiment.
Figure 8B:
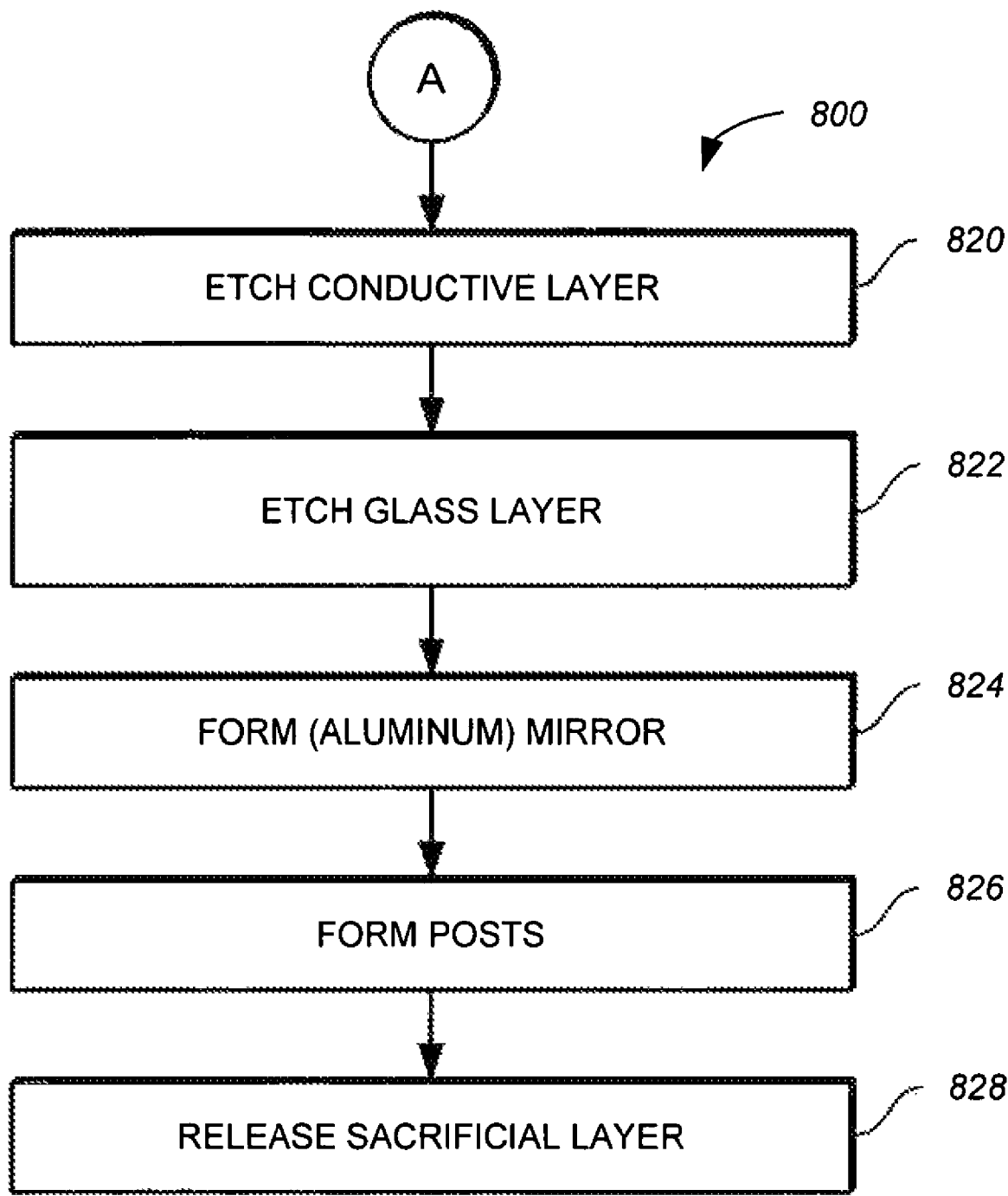

FIGS. 8A-8B illustrates a process 800 of fabricating an interferometric modulator display (e.g., interferometric modulator 700) in accordance with one embodiment.

Figure 9A:
FIGS. 9A-9N illustrate the process of manufacturing an interferometric modulator display according to the process of FIGS. 8A-8B.
Figure 9B:
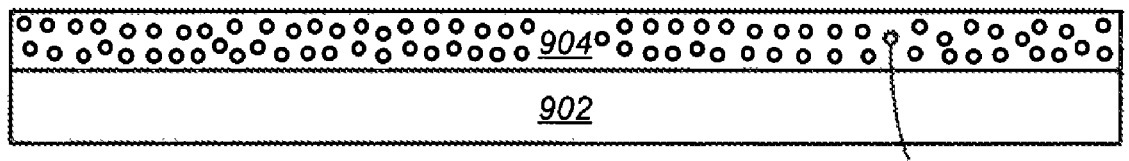
Figure 9C:
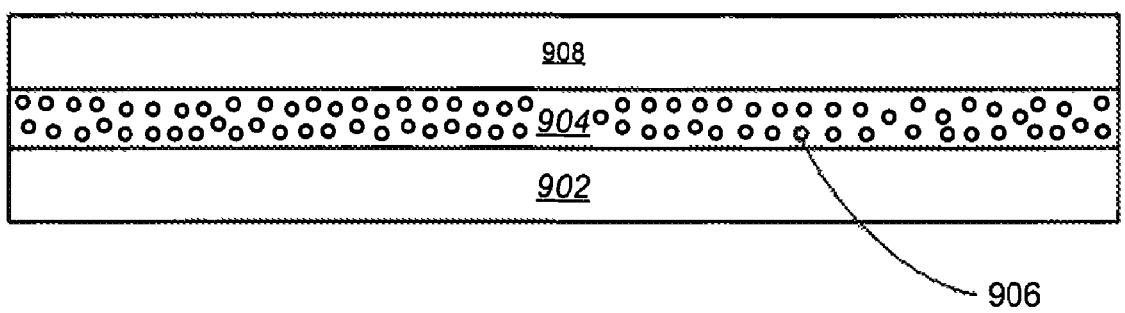
Figure 9D:
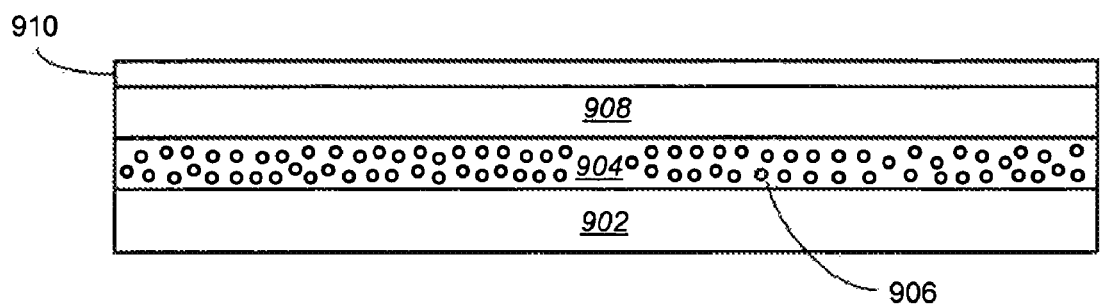
Figure 9E:
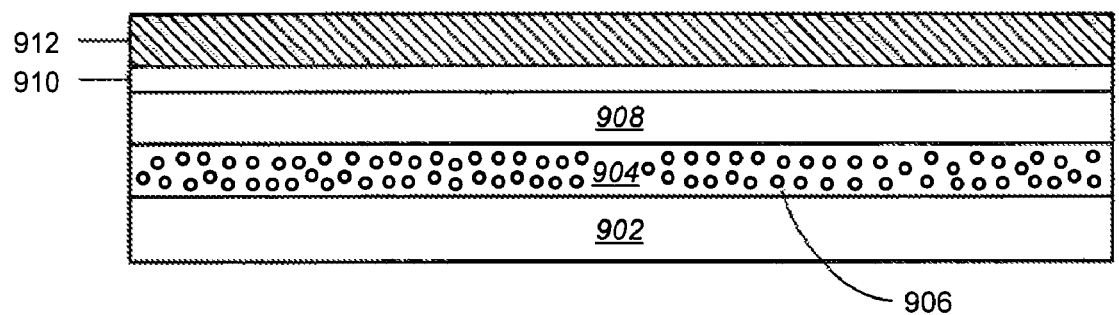

Referring first to FIG. 8A, the process 800 begins with providing a substrate (step 802). Referring to the example of FIG. 9A, a substrate 902 is provided. The substrate 902 can be transparent or not transparent. In one embodiment, the substrate 1102 comprises glass. A glass layer is deposited (step 804). As shown in FIG. 9B, a glass layer 904 is deposited over the substrate 902. In one embodiment, the glass layer 904 includes a plurality of scatterers (or reflectors) 906 for dispersing light, as discussed in greater detail above. The glass layer 904 can comprise spin-on glass (SOG) or any other transparent dielectric material. A conductive layer is formed (step 806). As shown in FIG. 9C, a conductive layer 908 is formed over the glass layer 904. In one embodiment the conductive layer 908 comprises one or more layers and/or films. For example, in one embodiment the conductive layer 908 comprises a conductive layer (e.g., indium tin oxide (ITO)) and a partially reflective layer (e.g., chromium). An oxide layer is deposited (step 808). As shown in FIG. 9D, an oxide layer 910 is deposited over the conductive layer 908. In one embodiment, the oxide layer 910 comprises a silicon oxide compound ($Si_XO_Y$). A sacrificial layer is deposited (step 810). Referring to FIG. 9E, a sacrificial layer 912 is deposited over the oxide layer 910. In one embodiment, the sacrificial layer 912 comprises molybdenum. In one embodiment, the height of the sacrificial layer 912 determines the amount of spacing between the first conductive layer 908 (or conductive plate) and a second conductive plate (e.g., a mechanical layer discussed below). In one embodiment, the height of the sacrificial layer 912 is substantially (1800 Å-2100 Å).

Figure 9F:
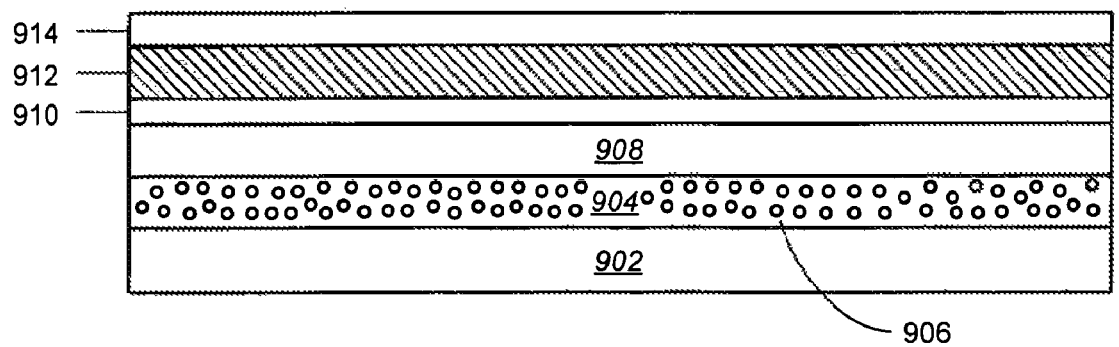
Figure 9G:
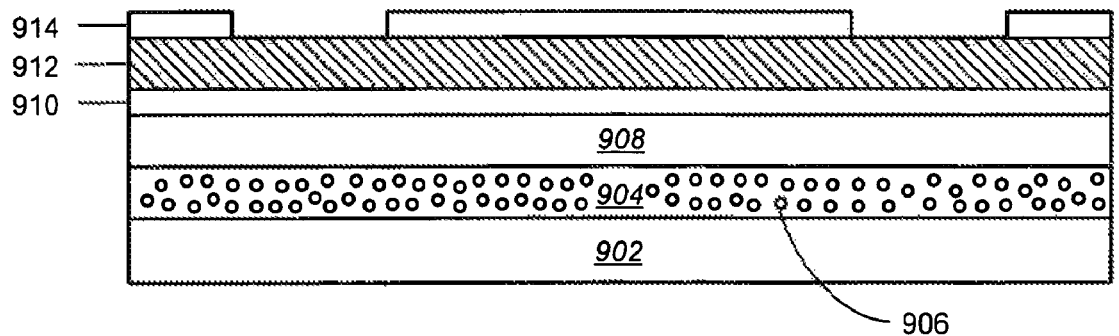
Figure 9H:
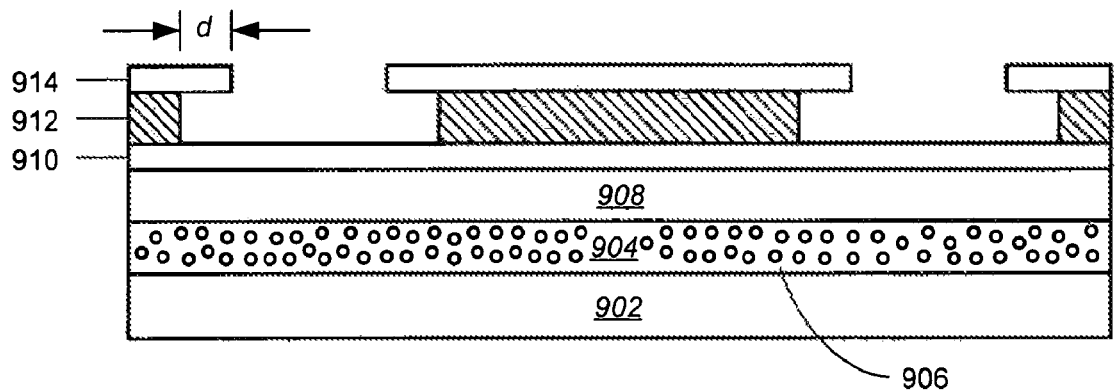
Figure 9I:
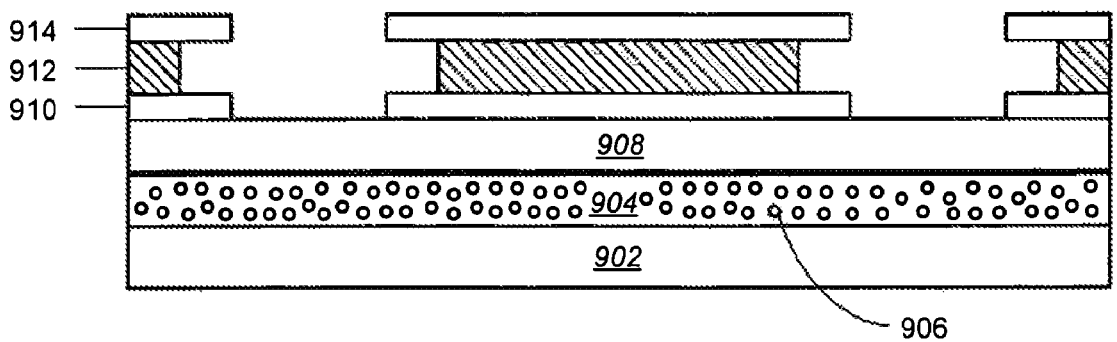
Figure 9J:
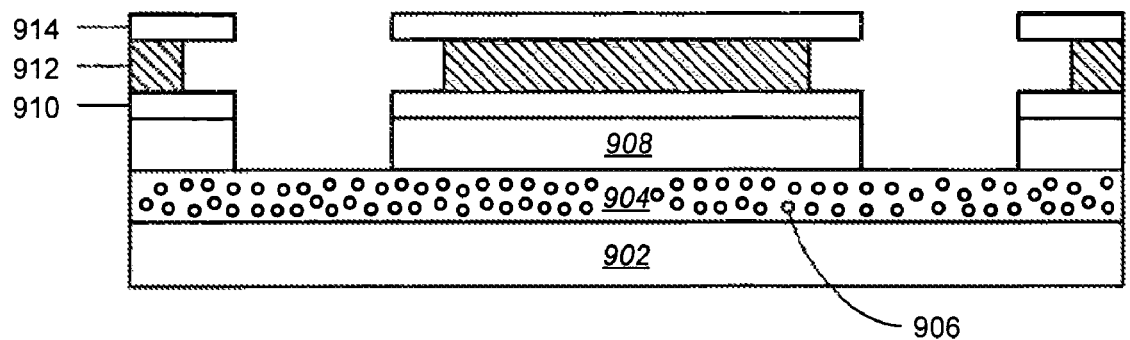
Figure 9K:
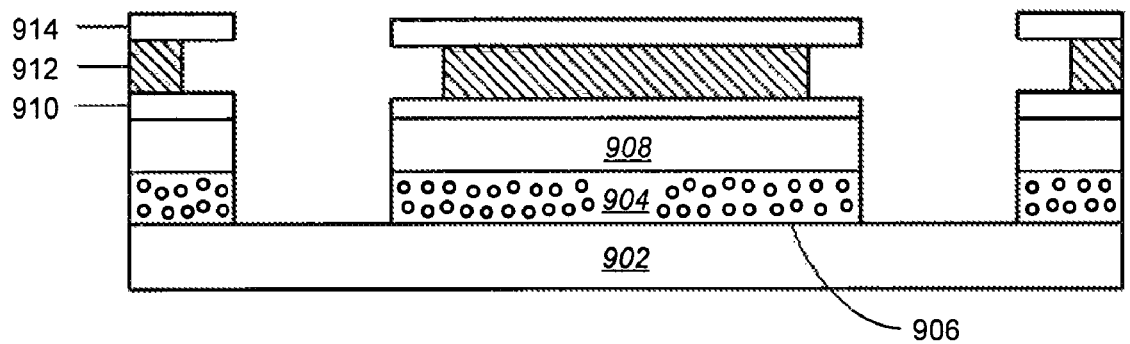

A mechanical layer is formed (step 812). Referring to the example of FIG. 9F, a mechanical layer 914 is formed over the sacrificial layer 912. In one embodiment, the mechanical layer 914 comprises a movable reflective layer as discussed above. In one embodiment, the mechanical layer 914 comprises aluminum/nickel, and has a height substantially in the range of 1100 Å-1300 Å. After formation of the mechanical layer, the process of forming the support posts for the mechanical layer begins. Accordingly, the mechanical layer is etched (step 812). Referring to the example of FIG. 9G, the mechanical layer 914 is etched at locations where support posts are desired The sacrificial layer is etched (step 816). As shown in FIG. 9H, (in one embodiment) a greater portion of the sacrificial layer 912 is etched relative to the portion of the mechanical layer 914 that was etched (or removed). In this embodiment, the sacrificial layer 912 is etched a distance d of approximately 0.5-1 μm greater than the mechanical layer 914. The oxide layer is etched (step 818). As shown in FIG. 9I, the oxide layer 910 is etched. The conductive layer is etched (step 820). Referring to FIG. 9J, the conductive layer 908 is etched. The glass layer is etched (step 822). As shown in FIG. 9K, the glass layer 904 is etched to reveal the substrate 902.

Figure 9L:
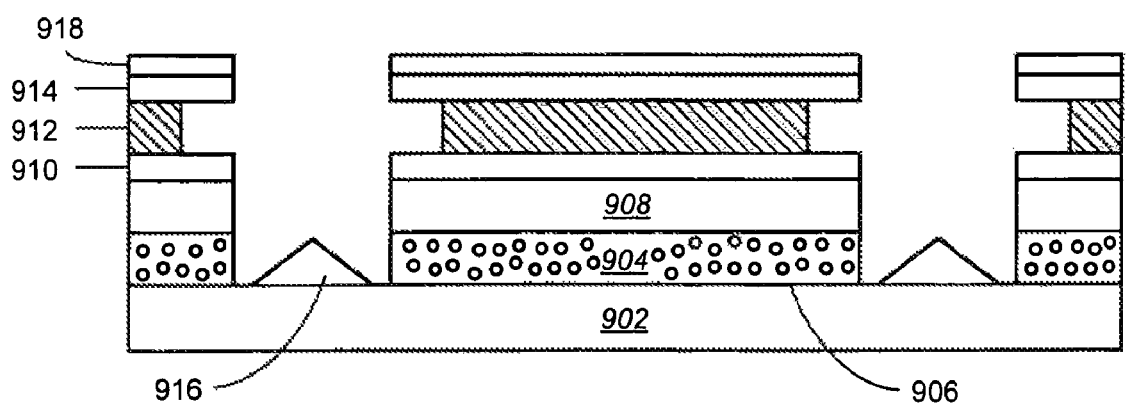
Figure 9M:
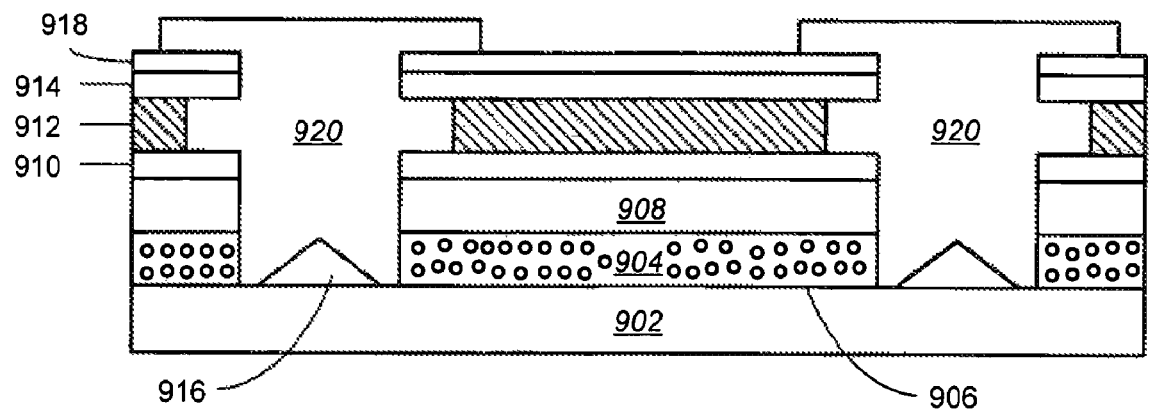
Figure 9N:
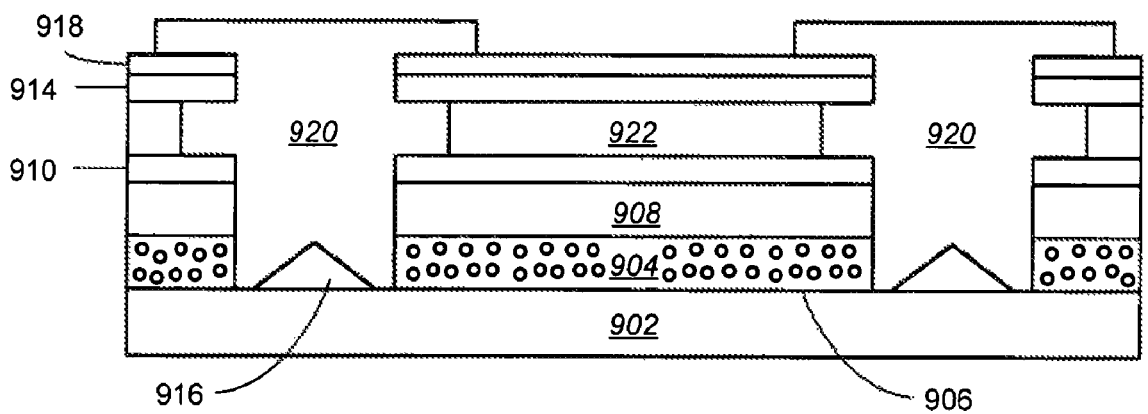

A mirror is formed (step 824). As shown in FIG. 9L, a mirror 916 is formed on the substrate 902. In one embodiment, the mirror 916 is formed by deposition of a (thin) metal layer 918 over the mechanical layer 914. In one embodiment, a thickness (or height) of the metal layer 918 is substantially in the range of 50-150 Å. The deposition of the thin metal layer 918 can be implemented through sputtering to achieve a pyramid-like structure for the mirror 916 so that the mirror 916 can deflect a light from a backlight throughout the glass layer 904 and the substrate 902. In one embodiment, the mirror 916 comprises aluminum or other reflective material. A plurality of posts are formed (step 826). As shown by FIG. 9M, posts 920 are formed within the etched portions of the layers of the interferometric modulator display. In one embodiment, the posts 920 are formed using a planarization technique followed by photolithography to remove unwanted portions of the material that comprise the posts 920. The posts 920 can comprise spin-on glass (SOG) or a transparent polymer. The sacrificial layer is released (step 828). Referring to FIG. 9N, the sacrificial layer 912 is released to form an air gap 922 between the mechanical layer 914 and the oxide layer 910. The sacrificial layer 912 can be released through one or more etch holes formed through the metal layer 918 and the mechanical layer 914. The one or more etch holes can be created after formation of the posts 920.

Figure 10A:
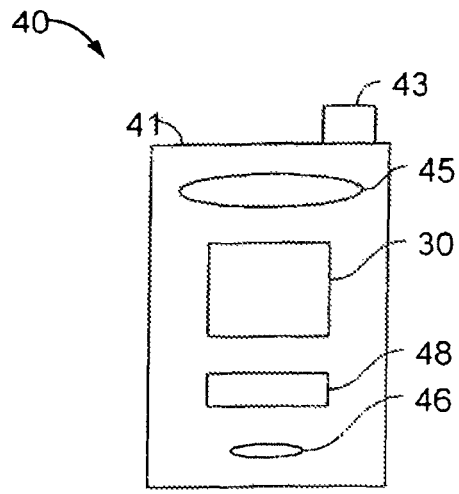
FIGS. 10A and 10B are system block diagrams illustrating an embodiment of a visual display device comprising a plurality of interferometric modulators.
Figure 10B:
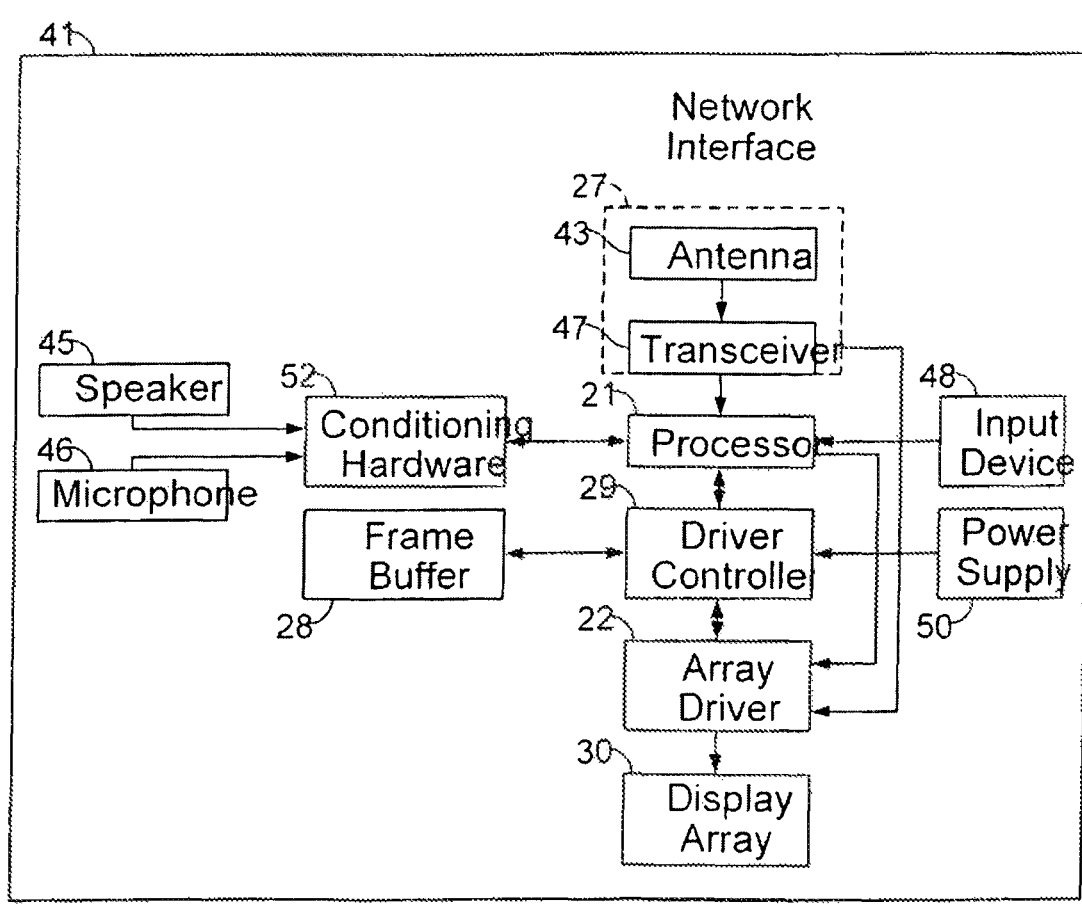

FIGS. 10A and 10B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 44, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 10B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one or more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display driver). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some embodiments control programmability resides, as described above, in a driver controller which can be located in several places in the electronic display system. In some cases control programmability resides in the array driver 22. Those of skill in the art will recognize that the above-described optimization may be implemented in any number of hardware and/or software components and in various configurations.

Various implementations of an interferometric modulator display have been described. Nevertheless, one of ordinary skill in the art will readily recognize that there that various modifications may be made to the implementations, and any variation would be within the spirit and scope of the present invention. For example, the process steps described above in connection with FIGS. 8A-8B may be performed in a different order and still achieve desirable results. In addition, the substrate can be treated so that scatterers are embedded within the substrate. Further, processes for creating etch hole (e.g., to release a sacrificial layer) are compatible with process steps discussed above. Accordingly, many modifications may be made by one of ordinary skill in the art without departing from the spirit can scope of the following claims.

What is claimed is:

1. A display comprising:
    a plurality of display elements supported by a transparent substrate, the plurality of display elements having a viewing side;
    a backlight positioned on a side of the plurality of display elements opposite the viewing side;
    one or more waveguides positioned between the display elements, the one or more waveguides configured to provide a path for light emitted by the backlight to illuminate the display elements, wherein the one or more waveguides comprise one or more posts configured to support at least a portion of the display elements; and
    a plurality of light scatterers or reflectors disposed between the transparent substrate and the plurality of display elements.

2. The display of claim 1, wherein the one or more waveguides are configured to direct the light emitted by the backlight to the viewing side of the display elements.

3. The display of claim 1, wherein the display elements are reflective display elements.

4. The display of claim 1, where in the display elements are micro electromechanical display elements.

5. The display of claim 4, wherein the display elements comprise interferometric modulators.

6. The display of claim 1, further comprising:
    a processor in electrical communication with the display elements, the processor configured to process image data; and
    a memory device in electrical communication with the processor.

7. The display of claim 1, wherein the plurality of light scatterers or reflectors are configured to redirect the light passing through the one or more waveguides to the display elements.

8. A display comprising:
a plurality of display elements having a viewing side, the plurality of display elements comprising interferometric modulators that comprise:
an optical stack coupled to a transparent substrate;
a reflective layer over the optical stack, forming a gap between the optical stack and the reflective layer; and
one or more posts wherein at least a portion of the one or more posts is disposed directly vertically between the optical stack and the reflective layer to support the reflective layer, the one or more posts comprising one or more waveguides; and
a backlight positioned on a side of the plurality of display elements opposite the viewing side, wherein the one or more waveguides are configured to provide a path for light emitted by the backlight to illuminate the display elements.

9. The display of claim 8, further comprising a plurality of light scatterers or reflectors disposed on the same side of the transparent substrate as the optical stack, wherein the plurality of light scatterers or reflectors are configured to redirect the light passing through the one or more waveguides to the display elements.

10. The display of claim 9, further comprising a glass layer on the viewing side of the display elements, the glass layer including the plurality of light scatterers or reflectors.

11. A display comprising:
a plurality of display elements having a viewing side;
a backlight positioned on a side of the plurality of display elements opposite the viewing side;
one or more waveguides positioned between the display elements, the one or more waveguides configured to provide a path for light emitted by the backlight to illuminate the display elements;
a plurality of light scatterers or reflectors configured to redirect the light passing through the one or more waveguides to the display elements; and
one or more reflecting surfaces arranged to direct light emitted by the one or more waveguides to the plurality of light scatterers or reflectors.

12. The Display of claim 11, further comprising a transparent substrate supporting the plurality of display elements, wherein the plurality of light scatterers or reflectors are disposed between the transparent substrate and the plurality of display elements.

13. A display comprising:
a plurality of means for modulating light formed on a substrate means, the plurality of light modulating means having a viewing side;
a means for emitting light positioned on a side of the plurality of light modulating means opposite the viewing side;
one or more means for guiding light positioned between the plurality of light modulating means, the one or more light guiding means configured to provide a path for light emitted by the light emitting means to illuminate the plurality of light modulating means, wherein the one or more light guiding means comprise one or more means for supporting at least a portion of the light modulating means; and
a plurality of means for scattering or reflecting light configured to redirect the light passing through the one or more light guiding means to the plurality of light modulating means, wherein the plurality of scattering or reflecting means are disposed on the same side of the substrate means as the plurality of light modulating means.

14. The display of claim 13, wherein the one or more light guiding means are configured to direct the light emitted by the light emitting means to the viewing side of the plurality of light modulating means.

15. A display comprising:
a plurality of means for modulating light having a viewing side, one or more of the plurality of light modulating means comprising:
a first means for reflecting coupled to a substrate means;
a second means for reflecting, said second reflecting means being movable and positioned over the first reflecting means forming a gap between the first reflecting means and the second reflecting means; and
means for supporting the second reflecting means, wherein at least a portion of the supporting means is disposed directly between the first reflecting means and the second reflecting means, wherein the supporting means comprises one or more means for guiding light; and
a means for emitting light positioned on a side of the plurality of light modulating means opposite the viewing side, wherein the one or more light guiding means are configured to provide a path for light emitted by the light emitting means to illuminate the plurality of light modulating means.

16. The display of claim 15, further comprising a plurality of means for scattering or reflecting light configured to redirect the light passing through the light guiding means to the light modulating means.

17. A display comprising:
a plurality of means for modulating light, the plurality of light modulating means having a viewing side;
a means for emitting light positioned on a side of the plurality of light modulating means opposite the viewing side;
one or more means for guiding light positioned between the plurality of light modulating means, the one or more light guiding means configured to provide a path for light emitted by the light emitting means to illuminate the plurality of light modulating means;
a plurality of means for scattering or reflecting light configured to redirect the light passing through the one or more light guiding means to the plurality of light modulating means; and
a means for reflecting arranged to direct light from the light guiding means to the plurality of light scattering or reflecting means.

18. The display of claim 17, wherein the plurality of light modulating means comprises a plurality of display elements, or wherein the light emitting means comprises a backlight, or wherein the one or more light guiding means comprises one or more light guides, or wherein the plurality of scattering or reflecting means comprises a plurality of scatterers or reflectors dispersed in a glass layer, or wherein the reflecting means comprises a reflective surface.

19. The Display of claim 17, further comprising a substrate means for supporting the plurality of light modulating means, wherein the plurality of scattering or reflecting means are disposed between the substrate means and the light modulating means.

20. A method for providing a display, the method comprising:

providing a plurality of display elements supported by a transparent substrate, the plurality of display elements having a viewing side;

positioning a backlight on a side of the plurality of display elements opposite the viewing side;

forming one or more waveguides between the display elements, wherein the one or more waveguides are configured to provide a path for light emitted by the backlight to illuminate the display elements, wherein the one or more waveguides comprise one or more posts configured to support at least a portion of the display elements; and forming a plurality of light scatterers or reflectors on the same side of the transparent substrate as the display elements.

21. The method of claim 20, wherein the plurality of light scatterers or reflectors are configured to redirect the light passing through the one or more waveguides to the display elements.

22. A method for providing a display, the method comprising:

providing a transparent substrate;

forming a plurality of interferometric modulators having a viewing side including:
coupling an optical stack to the transparent substrate;
forming a reflective layer over the optical stack forming a gap between the optical stack and the reflective layer; and
forming one or more posts wherein at least a portion of the one or more posts is disposed between the optical stack and the reflective layer to support the reflective layer, the one or more posts comprising one or more waveguides; and positioning a backlight on a side of the interferometric modulators opposite the viewing side, wherein the one or more waveguides are configured to provide a path for light emitted by the backlight to illuminate the interferometric modulators.

23. A method for providing a display, the method comprising:

providing a plurality of display elements having a viewing side;

positioning a backlight on a side of the plurality of display elements opposite the viewing side;

forming one or more waveguides between the display elements, wherein the one or more waveguides are configured to provide a path for light emitted by the backlight to illuminate the display elements;

forming a plurality of light scatterers or reflectors configured to redirect the light passing through the one or more waveguides to the display elements; and forming one or more reflective surfaces arranged to direct the light from the one or more waveguides toward the plurality of light scatterers or reflectors.

\* \* \* \* \*

UNITED STATES PATENT AND TRADEMARK OFFICE
CERTIFICATE OF CORRECTION

PATENT NO.      : 7,933,475 B2
APPLICATION NO. : 12/544184
DATED           : April 26, 2011
INVENTOR(S)     : Wang et al.

It is certified that error appears in the above-identified patent and that said Letters Patent is hereby corrected as shown below:

Title Page 3, Column 2, Line 57, item (56) (Other Publications), "Rosonator Channel" should be changed to --Resonator Channel--

Title Page 4, Column 1, Line 4, item (56) (Other Publications), "State,ent in" should be changed to --Statement in--

Title Page 4, Column 1, Line 11, item (56) (Other Publications), "Examinatin and" should be changed to --Examination and--

Title Page 4, Column 1, Line 15, item (56) (Other Publications), "for Contimued" should be changed to --for Continued--

Title Page 4, Column 1, Lines 45-46, item (56) (Other Publications), "Informatin Disclosure Statement In" should be changed to --Information Disclosure Statement in--

Title Page 4, Column 2, Lines 32, item (56) (Other Publications), "Examinatin and Information Dosclosure" should be changed to --Examination and Information Disclosure--

Column 9, Line 35, "are desired The" should be changed to --are desired. The--

Column 12, Line 34, "art without de" should be changed to --art without de- --

Column 12, Line 58, "where in the" should be changed to --wherein the--

Column 13, Line 45, "The Display of" should be changed to --The display of--

Column 14, Line 61, "The Display of" should be changed to --The display of--

Signed and Sealed this
Twenty-second Day of November, 2011

David J. Kappos
*Director of the United States Patent and Trademark Office*